United States Patent
Rodriguez et al.

(10) Patent No.: US 7,768,694 B2
(45) Date of Patent: Aug. 3, 2010

(54) EFFICIENT HARMONIC GENERATION AND FREQUENCY CONVERSION IN MULTI-MODE CAVITIES

(75) Inventors: Alejandro Rodriguez, Cambridge, MA (US); John D. Joannopoulos, Belmont, MA (US); Steven G. Johnson, Cambridge, MA (US); Marin Soljacic, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 135 days.

(21) Appl. No.: 12/030,459

(22) Filed: Feb. 13, 2008

(65) Prior Publication Data

US 2008/0247428 A1    Oct. 9, 2008

Related U.S. Application Data

(60) Provisional application No. 60/889,566, filed on Feb. 13, 2007.

(51) Int. Cl.
*G02F 1/35* (2006.01)
(52) U.S. Cl. .................................. 359/326; 359/330
(58) Field of Classification Search ......... 359/326–330; 372/21–22
See application file for complete search history.

(56) References Cited

U.S. PATENT DOCUMENTS

| | | | |
|---|---|---|---|
| 2002/0154663 A1 | 10/2002 | Zhu et al. | |
| 2003/0039023 A1* | 2/2003 | Romagnoli et al. | 359/326 |
| 2004/0218880 A1 | 11/2004 | Matsko et al. | |
| 2006/0092500 A1* | 5/2006 | Melloni et al. | 359/330 |

OTHER PUBLICATIONS

Database Compendex, Engineering Information Inc., New York; NY; US May 31, 2007; Rodriguez et al., "Chi, <(2)> and Chi <(3)> harmonic generation at a critical power in inhomogeneous doubly resonant cavities" XP002482127; vol. 15, No. 12; Jun. 11, 2007; 1 page.

Database Inspec; The Institution of Electrical Engineers, Stevenage, GB; Dec. 1, 2006; Dumeige et al., "Whispering-gallery-mode analysis of phase-matched doubly resonant second-harmonic generation" XP 002482128, 1 page.

* cited by examiner

*Primary Examiner*—Hemang Sanghavi
(74) *Attorney, Agent, or Firm*—Gauthier & Connors, LLP

(57) ABSTRACT

A doubly-resonant cavity structure includes at least one cavity structures so as to allow total frequency conversion for second or third-harmonic generation using $\chi^{(2)}$ and $\chi^{(3)}$ non-linearities between the at least one cavity structures. The total frequency conversion is efficiently optimized by determining a critical power allowing for such total frequency conversion to occur depending on the cavity parameters of the at least one cavity structures.

27 Claims, 7 Drawing Sheets

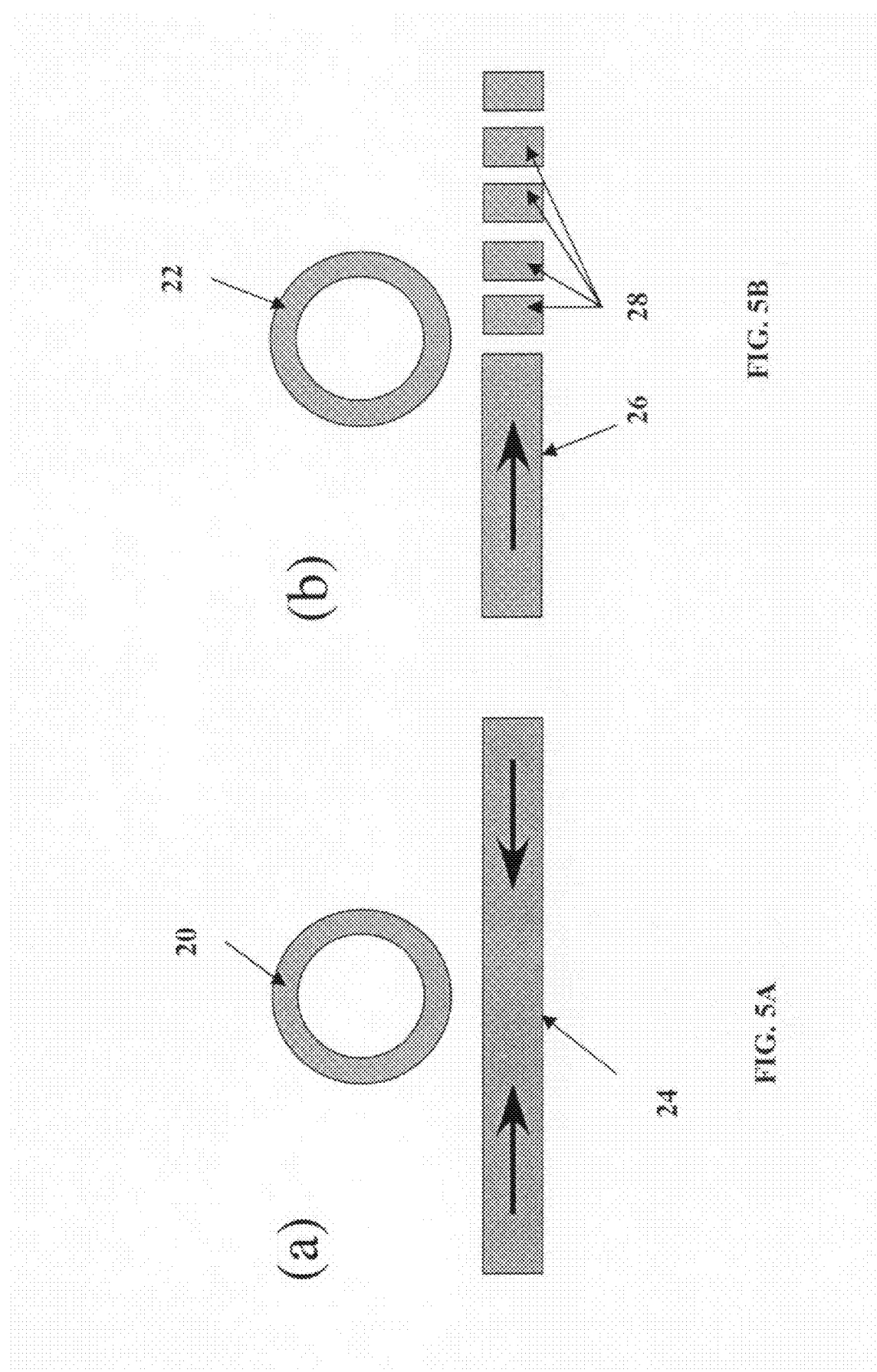

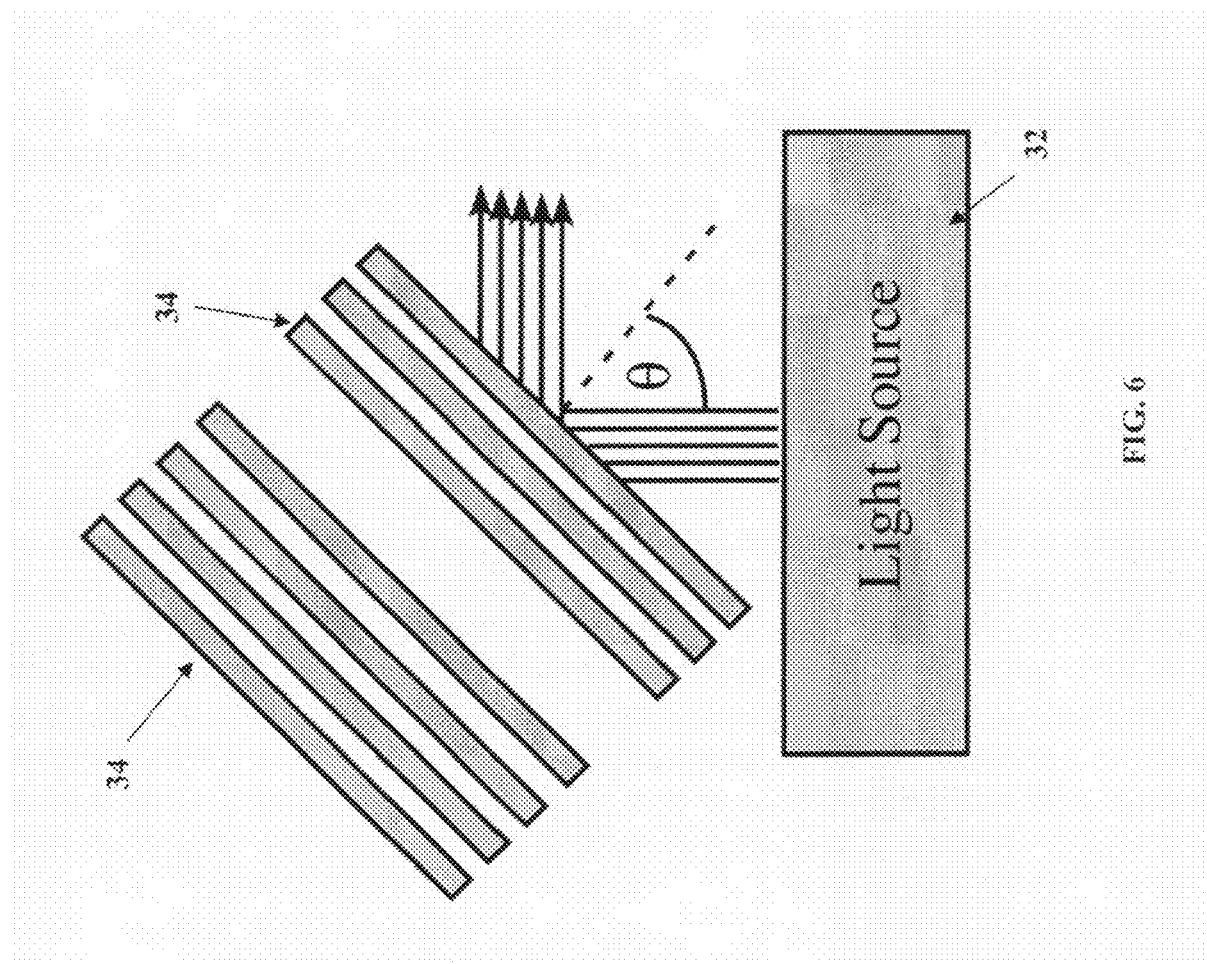

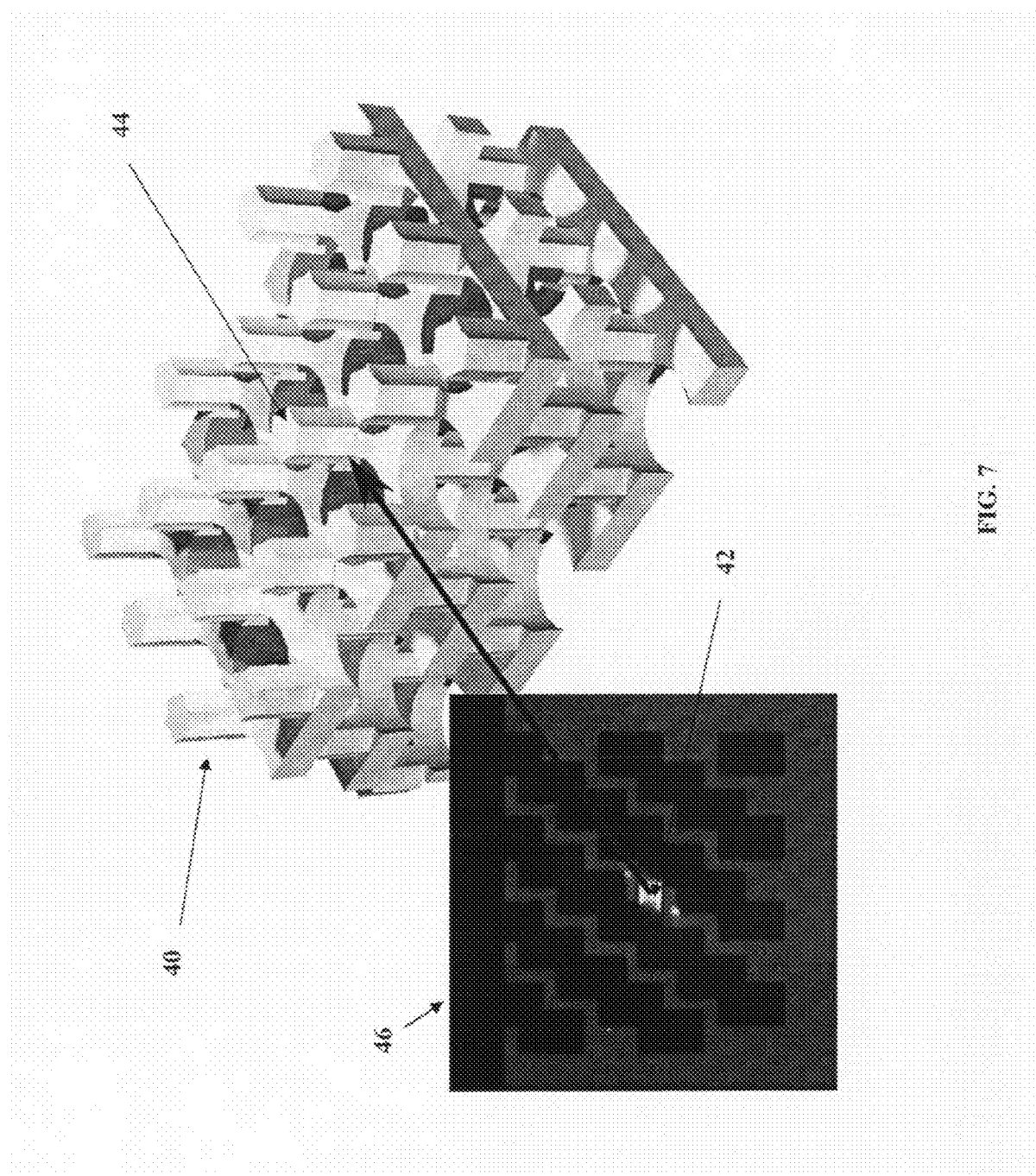

US 7,768,694 B2

EFFICIENT HARMONIC GENERATION AND FREQUENCY CONVERSION IN MULTI-MODE CAVITIES

PRIORITY INFORMATION

This application claims priority from provisional application Ser. No. 60/889,566 filed Feb. 13, 2007, which is incorporated herein by reference in its entirety.

This invention was made with government support awarded by the National Science Foundation under Contract No. DMR-9400334. The government has certain rights in the invention.

BACKGROUND OF THE INVENTION

The invention relates to the field of coupled cavity structures, and in particular to an efficient harmonic generation and frequency conversion scheme in multi-mode cavity structures.

Nonlinear frequency conversion has been commonly realized in the context of waveguides, or even for free propagation in the nonlinear materials, in which light at one frequency co-propagates with the generated light at the harmonic frequency. A phase-matching condition between the two frequencies must be satisfied in this case in order to obtain efficient conversion. Moreover, as the input power is increased, the frequency conversion eventually saturates due to competition between up and down conversion. Previous experimental and theoretical work on second-harmonic generation in cavities has largely focused on cavities with a single resonant mode at the pump frequency. Such structures require much higher powers than our proposed doubly-resonant cavity, however, approaching one Watt and/or requiring amplification within the cavity.

Second-harmonic generation in a doubly resonant cavity, with a resonance at both the pump and harmonic frequency, have previously been analyzed only in the limit where nonlinear down-conversion can be neglected. Previous work on third-harmonic generation in cavities, similarly, considered only singly resonant cavities; moreover, past work focused on the case of $\chi^{(2)}$ materials where $3\omega$ is generated by cascading two nonlinear processes (harmonic generation and frequency summing). Furthermore, the previous theoretical work, with a few exception, focused on one-dimensional Fabry-Perot cavity geometries, in which the problem of obtaining cavity modes with the correct frequency ratio was posed as a problem of phase-matching, and addressed by methods such as using off-normal beams.

SUMMARY OF THE INVENTION

According to one aspect of the invention, there is provided a doubly-resonant cavity structure. The doubly-resonant cavity structure includes at least one cavity structures so as to allow total frequency conversion for second or third-harmonic generation using $\chi^{(2)}$ and $\chi^{(3)}$ nonlinearities between the at least one cavity structures. The total frequency conversion is efficiently optimized by determining a critical power allowing for such total frequency conversion to occur depending on the cavity parameters of the at least one cavity structures.

According to another aspect of the invention, there is provided a method of performing total frequency conversion in a doubly-resonant cavity structure. The method includes providing at least one cavity structures so as to allow the total frequency conversion for second or third-harmonic generation using $\chi^{(2)}$ and $\chi^{(3)}$ nonlinearities between the at least one cavity structures. Also, the method includes determining the cavity parameter of the at least one cavity structures. In addition, the method includes determining a critical power to efficiently optimized the total frequency conversion using the cavity parameters of the at least one cavity structures. Furthermore, the method includes applying the critical power so as to allow total frequency conversion between the at least one cavity structures to occur.

According to another aspect of the invention, there is provided method of forming a doubly-resonant cavity structure. The method includes forming at least two cavity structures so as to allow total frequency conversion for second or third-harmonic generation using $\chi^{(2)}$ and $\chi^{(3)}$ nonlinearities between the at least two cavity structures. Moreover, the method includes determining the cavity parameters of the at least two cavity structures so as to determine the critical power needed to perform the total frequency conversion.

BRIEF DESCRIPTION OF THE DRAWINGS

FIGS. 5A-5B are schematic diagrams illustrating a ring resonator with uniform waveguide coupling and asymmetrical waveguide coupling;

FIG. 6 is schematic diagram illustrating a possible harmonic conversion system formed in accordance with the invention; and FIG. 7 is schematic diagram illustrating a 3d photonic crystal (PhC) cavity created by adding a defect in a rod-layer of a (111) fcc lattice of dielectric rods.

DETAILED DESCRIPTION OF THE INVENTION

The invention permits the generals conditions for 100% frequency conversion in any doubly resonant nonlinear cavity to occur, for both second- and third-harmonic generation via $\chi^{(2)}$ and $\chi^{(3)}$ nonlinearities. Conversion efficiency is optimized for a certain "critical" power depending on the cavity parameters, and assuming reasonable parameters one can predict 100% conversion using milliwatts of power or less. These results follow from a general coupled-mode theory framework that is derived for harmonic generation in cavities, and which is verified by direct finite-difference time-domain (FDTD) simulations of the nonlinear Maxwell equations. Explicit formulas for the nonlinear coupling coefficients are derived in terms of the linear cavity modes, which can be used to design and evaluate cavities in arbitrary geometries. The effect of linear and nonlinear losses is also analyzed Frequency conversion in a doubly-resonant cavity, as we shall derive, has three fundamental differences from this familiar case of propagating modes. First, light in a cavity can be much more intense for the same input power, because of the spatial (modal volume V) and temporal (lifetime Q) confinement. The invention shows that this enhances second-harmonic ($\chi^{(2)}$) conversion by a factor of $Q^3/V$ and enhances third-harmonic ($\chi^{(3)}$) conversion by a factor of $Q^2/V$. Second, the phase-matching condition is replaced by the condition that the cavity support two modes of the requisite frequencies, the frequencies can be designed by tuning any of a number of cavity parameters. Third, the frequency conversion no longer saturates—instead, it peaks at 100%, with proper design, for a certain critical input power satisfying a resonant condition, and goes to zero if the power is either too small or too large.

Figure 1:
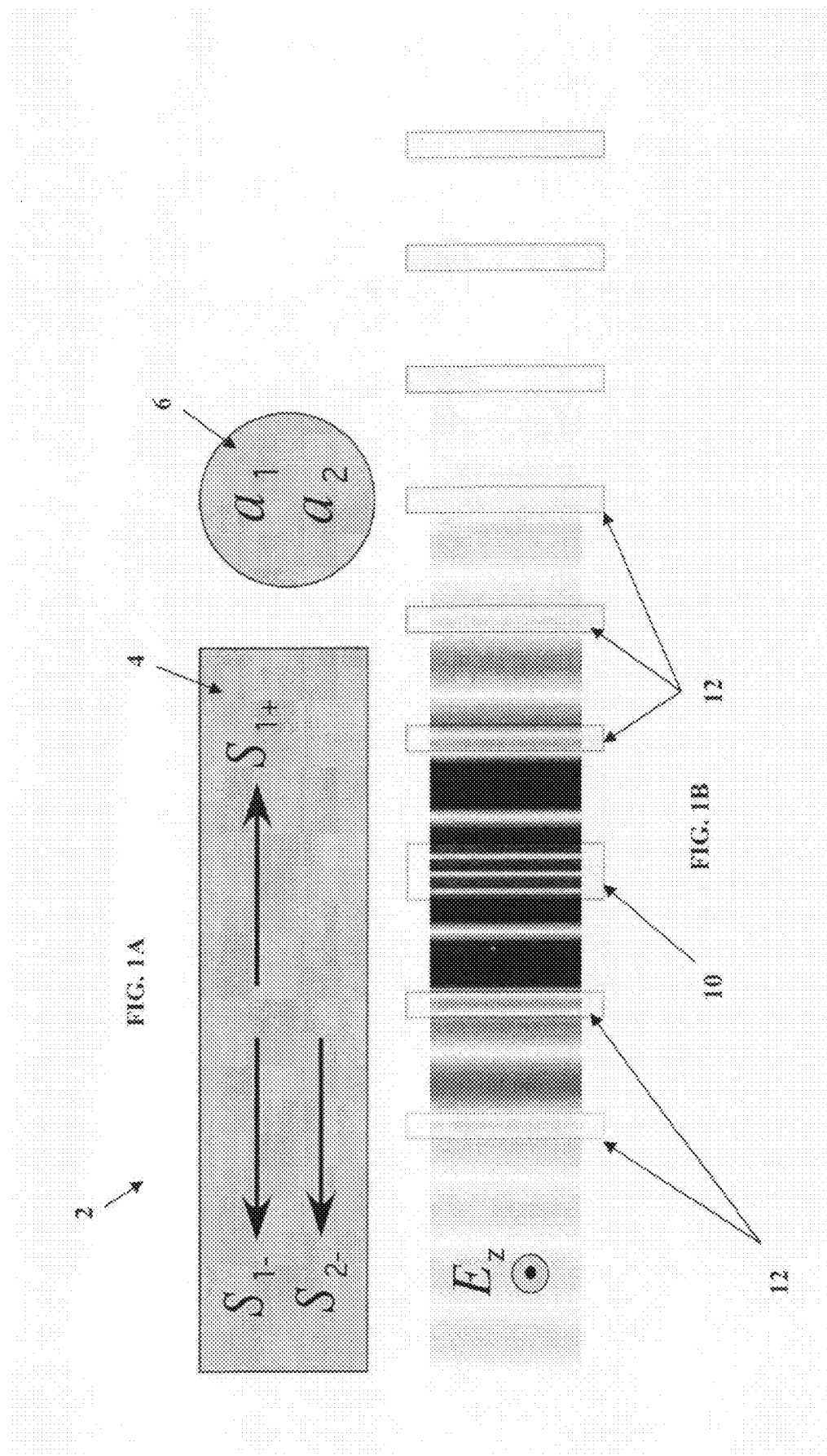
FIGS. 1A-1B are schematics diagrams illustrating waveguide-cavity systems used by the invention.

FIG. 1A shows a schematic diagram of waveguide-cavity system 2 used by the invention. Input light from a waveguide 4 at one frequency with an amplitude $s_{1+}$ is coupled to a cavity 6 having a cavity mode with an amplitude $a_1$, converted to a cavity mode at another frequency with an amplitude $a_2$ by a nonlinear process, and radiated back into the waveguide 4 with an amplitude $s_{2-}$. Reflections at the first frequency ($s_{1-}$) can also occur.

FIG. 1B shows a two-mode nonlinear cavity coupled to an input/output channel, and in particular a Fabry-Perot cavity 10 between two quarter-wave stacks 12, where the stack has fewer layers on one side so that light can enter/escape. For a nonlinear effect, one can consider specifically a $\chi^{(l)}$ nonlinearity, corresponding essentially to a shift in the refractive index proportional to the nonlinear susceptibility $\chi^{(l)}$ multiplied by electric field E to the $(l-1)^{th}$ power. Most commonly, one would have either a $\chi^{(2)}$ or $\chi^{(3)}$ (Kerr) effect. Such a nonlinearity results in harmonic generation: light with frequency ω is coupled to light with frequency lω. Therefore, if we design the cavity so that it supports two modes, one at ω and one at lω, then input power at ω can be converted, at least partially, to output power at lω.

In order to achieve 100% conversion from ω to lω inside a cavity, it is not always sufficient to simply increase the input power in order to increase the rate of nonlinear transfer. Putting aside the question of at what point material breakdown will occur, increasing the input power for a $\omega^{(3)}$ medium (or any odd l) also causes a shift in the resonant frequency (self-phase modulation) that, unchecked, will prevent 100% conversion by making the frequency ratio ≠l. To address this mismatch, one can use two materials with opposite-sign $\chi^{(l)}$ to cancel the frequency-shifting effect; it may also be possible to pre-shift the cavity resonant frequency to correct for the nonlinear shift. On the other hand, a $\chi^{(2)}$ medium has no self-phase modulation, and so in this case it is sufficient to increase the input power until 100% frequency conversion is reached. Regarding material breakdown, we show that it is sufficient to use modes with a large quality factor (lifetime) Q so that a slow conversion due to a weak nonlinear effect has enough time to occur.

Nonlinear frequency conversion has previously been studied with both direct simulation and by semi-analytic perturbative methods. In particular, the most common perturbative approach is known as "coupled-wave" or "coupled-mode" theory (CMT): essentially, one writes a set of ordinary differential equations for the amplitudes of the linear modes, in which these amplitudes are weakly coupled by the nonlinearity. The most common variation of this CMT approach is for waveguides, in which the only degrees of freedom are two (or more) coupled waveguide modes, as described in. In this case, the problem is modified by the fact that the modes are continuously "pumped" by an external input, and the quantity of interest is the power radiated to an external output.

There are two approaches to developing a CMT for such a problem. First, in the "temporal" CMT, the most general possible CMT is derived from fundamental principles such as conservation of energy and reciprocity, parameterized by a few unknown frequencies and coupling factors that reflect the specific geometry. Second, one can apply perturbative expansions directly to Maxwell's equations to derive explicit expressions for the coupling factors. Although both approaches have been successfully employed to describe various nonlinear phenomena, frequency conversion in doubly-resonant cavities does not seem to have been fully addressed. In the following, both approaches are applied to derive both the most general CMT and also the specific coupling factors for l=2, 3.

The couple-mode equations are derived describing the interaction of light in a multi-mode cavity filled with nonlinear material and coupled to input/output ports, from which light can couple in ($s_+$) and out ($s_-$) of the cavity. The schematic illustration of the system is shown in FIG. 1A. Specifically, the formalism is adapted to handle nonlinearly coupled modes with frequencies $\omega_k$, which is parameterized as follows.

The time-dependent complex amplitude of the kth mode is denoted by $a_k$, normalized so that $|a_k|^2$ is the electromagnetic energy stored in this mode. The time-dependent amplitude of the incoming (+) or outgoing (−) wave is denoted by $s_\pm$, normalized so that $|s_\pm|^2$ is the power. More precisely, $s_\pm(t)$ is normalized so that its Fourier transform $|s_\pm(\omega)|^2$ is the power at ω. By itself, a linear cavity mode decaying with a lifetime $\tau_k$ would be described by $da_k/dt=(i\omega_k-1/\tau_k)a_k$. The decay rate $1/\tau_k$ can be decomposed into $1/\tau_k=1/\tau_{e,k}+1/\tau_{s,k}$ where $1/\tau_{e,k}$ is the "external" loss rate (absorption etc.) and $1/\tau_{s,k}$ is the decay rate into $s_-$. When the weak coupling ($\omega_k\tau_k\gg 1$) to $s_\pm$ is included, energy conservation and similar fundamental constraints lead to equations of the form:

$$\frac{da_k}{dt} = \left(i\omega_k - \frac{1}{\tau_k}\right)a_k + \sqrt{2\tau_{s,k}}s_+ \quad (1)$$

$$s_- = -s_+ + \sqrt{2\tau_{s,k}}a_k \quad (2)$$

This can be generalized to incorporate multiple input/output ports, direct coupling between the ports, and so on. The only unknown parameters in this model are then the frequencies $\omega_k$ and the decay rates $1/\tau_k$, which can be determined by any numerical method to solve for the cavity modes (e.g. FDTD, below). Instead of $\tau_k$, one commonly uses the quality factor $Q_k=\omega_k\tau_k/2$.

Nonlinearity modifies this picture with two new amplitude-dependent effects: a shift in the frequency (and decay rate) of the cavity, and a coupling of one cavity mode to another. The nonlinear effects are neglected on the input/output ports, under the assumption that intense fields are only present in the cavity (due to spatial and temporal confinement). Two standard assumptions are made of nonlinear systems. First, that the nonlinearities are weak, in the sense that we can neglect terms of order $(\chi^{(l)})^2$ or higher; this is true in practice because nonlinear index shifts are always under 1% lest material breakdown occur. Second, we make the rotating wave approximation: since the coupling is weak, we only include terms for $a_k$ that have frequency near $\omega_k$. In particular, we suppose that $\omega_k\approx k\omega_1$, so that $\omega_k$ is the kth harmonic. Then, for a $\chi^{(2)}$ nonlinearity with two modes $\omega_1$ and its second harmonic $\omega_2$, the coupled-mode equations must take the form:

$$\frac{da_1}{dt} = \left(i\omega_1 - \frac{1}{\tau_1}\right)a_1 - i\omega_1\beta_1 a_1^* a_2 + \sqrt{\frac{2}{\tau_{1,s}}}s_+ \quad (3)$$

$$\frac{da_2}{dt} = \left(i\omega_2 - \frac{1}{\tau_2}\right)a_2 - i\omega_2\beta_2 a_1^2 + \sqrt{\frac{2}{\tau_{2,s}}}s_+ \quad (4)$$

Similarly, for a $\chi^{(3)}$ nonlinearity with two modes $\omega_1$ and its third harmonic $\omega_3$, the coupled-mode equations must take the form:

$$\frac{da_1}{dt} = \left(i\omega_1(1-\alpha_{11}|a_1|^2 - \alpha_{13}|a_3|^2) - \frac{1}{\tau_1}\right)a_1 - i\omega_1\beta_1(a_*, 1)^2 a_3 + \sqrt{\frac{2}{\tau_{1,s}}} s_+ \quad (5)$$

$$\frac{da_3}{dt} = \left(i\omega_3(1-\alpha_{33}|a_3|^2 - \alpha_{31}|a_1|^2) - \frac{1}{\tau_3}\right)a_3 - i\omega_3\beta_3 a_3, 1 + \sqrt{\frac{2}{\tau_{3,s}}} s_+ \quad (6)$$

In equations 3-6, one sees two kinds of terms. The first are frequency-shifting terms, with coefficients $\alpha_{ij}$, dependent on one of the field amplitudes. For $\chi^{(3)}$, this effect is known as self-phase and cross-phase modulation, which is absent for $\chi^{(2)}$ (under the first-order rotating-wave approximation). The second kind of term transfers energy between the modes, with coupling coefficients $\beta_i$, corresponding to four-wave mixing for $\chi^{(3)}$. Furthermore, one can constrain the coupling terms $\beta_i$ by energy conservation:

$$\frac{d}{dt}(|a_1|^2 + |a_2|^2) = 0.$$

For $\chi^{(2)}$, the constraint that follows is: $\omega_1\beta_1 = \omega_2\beta^*_2$; for $\chi^{(3)}$, the constraint is $\omega_1\beta_1 = \omega_3\beta^*_3$.

The general process for construction of these coupled-mode equations is as follows. The underlying nonlinearity must depend on the physical, real part of the fields, corresponding to $(a_k + a^*_k)/2$. It then follows that the $\chi^{(l)}$ term will have $l$ powers of this real part, giving various product terms like $a^*_1 a_2$ (for $\chi^{(2)}$) and $a^*_1 a_1 a_1$ (for $\chi^{(3)}$). Most of these terms, however, can be eliminated by the rotating-wave approximation. In particular, we assume that each $a_k$ term is proportional to $e^{ki\omega}$ multiplied by a slowly varying envelope, and we discard any product term whose total frequency differs from $k\omega$ for the $da_k/dt$ equation. Thus, a term like $a^*_1 a_3 a_3$ would be proportional to $e^{5i\omega}$, and would only appear in a $da_5/dt$ equation.

At this point, the equations are already useful in order to reason about what types of qualitative behaviors are possible in general. In fact, they are not even specific to electromagnetism and would also apply to other situations such as acoustic resonators. However, in order to make quantitative predictions, one needs to know the nonlinear coefficients $\alpha_{ij}$ and $\beta_i$ (as well as the linear frequencies and decay rates). The evaluation of these coefficients requires a more detailed analysis of Maxwell's equations as described below.

When a dielectric structure is perturbed by a small $\delta\varepsilon$, a well-known result of perturbation theory states that the corresponding change $\delta\omega$ in an eigenfrequency $\omega$ is, to first order:

$$\frac{\delta\omega}{\omega} = -\frac{1}{2}\frac{\int d^3x \delta\varepsilon |E|^2}{\int d^3x \varepsilon |E|^2} = -\frac{1}{2}\frac{\int d^3x E^* \cdot \delta P}{\int d^3x \varepsilon |E|^2} \quad (7)$$

where E is the unperturbed electric field and $\delta P = \delta\varepsilon E$ is the change in polarization density due to $\delta\varepsilon$. In fact, Eq. 7 is general enough to be used with any $\delta P$, including the polarization that arises from a nonlinear susceptibility. In particular, we can use it to obtain the coupling coefficients of the CMT.

To do so, one first computes the nonlinear first-order frequency perturbation due to the total field E present from all of the modes. Once the frequency perturbations $\delta\omega_k$ are known, one can re-introduce these into the coupled-mode theory by simply setting $\omega_k \to \omega_k + \delta\omega_k$ in Eq. 1. By comparison with Eqs. 3-6, the $\alpha$ and $\beta$ coefficients can then be identified.

First a $\chi^{(2)}$ nonlinearity case is considered, with P given by $$P_i = \sum_{jk} \varepsilon \chi^{(2)}_{ijk} E_j E_k,$$

in a cavity with two modes $E_1$ and $E_2$. As before, the modes are required to oscillate with frequency $\omega_1$ and $\omega_2 \approx 2\omega_1$, respectively. Taking $E=\text{Re}[E_1 e^{i\omega_1 t} + E_2 e^{i\omega_2 t}]$ and using the rotating-wave approximation, one can separate the contribution of $\delta P$ to each $\delta\omega_k$, to obtain the following frequency perturbations:

$$\frac{\delta\omega_1}{\omega_1} = -\frac{1}{4}\frac{\int d^3x \times \sum_{ijk} \varepsilon\chi^{(2)}_{ijk}[E^*_{1i}(E_{2j}E^*_{1k} + E^*_{1j}E_{2k})]}{\int d^3x \varepsilon |E_1|^2}, \quad (8)$$

$$\frac{\delta\omega_2}{\omega_2} = -\frac{1}{4}\frac{\int d^3x \times \sum_{ijk} \varepsilon\chi^{(2)}_{ijk} E_{2i}E_{1j}E_{1k}}{\int d^3x \varepsilon |E_2|^2} \quad (9)$$

Similarly, for a centro-symmetric $\omega^{(3)}$ medium, P is given by $P=\varepsilon\chi^{(3)}|E|^2 E$, with $E=\text{Re}[E_1 e^{i\omega_1 t} + E_3 e^{i\omega_3 t}]$. One can obtain the following frequency perturbations:

$$\frac{\delta\omega_1}{\omega_1} = -\frac{1}{8}\left\{\frac{\int d^3x \varepsilon\chi^{(3)}\left[\begin{array}{c}|E_1 \cdot E_1|^2 + 2|E_1 \cdot E^*_1|^2 + \\ 2(E_1 \cdot E^*_1)(E_3 \cdot E^*_3) + \end{array}\right]}{\int d^3x \varepsilon\chi^{(3)}|E_1|^2} \cdots + \frac{\int d^3x \varepsilon\chi^{(3)}\left[\begin{array}{c}2|E_1 \cdot E_3|^2 + 2|E_1 \cdot E^*_3|^2 + \\ 3(E_1 \cdot E^*_1)(E_1 \cdot E^*_3) + \end{array}\right]}{\int d^3x \varepsilon\chi^{(3)}|E_1|^2}\right\} \quad (10)$$

$$\frac{\delta\omega_3}{\omega_3} = -\frac{1}{8}\left\{\frac{\int d^3x \varepsilon\chi^{(3)}\left[\begin{array}{c}|E_3 \cdot E_3|^2 + 2|E_3 \cdot E^*_3|^2 + \\ 2(E_3 \cdot E^*_3)(E_1 \cdot E^*_1) + \end{array}\right]}{\int d^3x \varepsilon\chi^{(3)}|E_3|^2} \cdots + \frac{\int d^3x \varepsilon\chi^{(3)}\left[\begin{array}{c}2|E_1 \cdot E_3|^2 + 2|E_3 \cdot E^*_1|^2 + \\ (E^*_1 \cdot E^*_1)(E^*_1 \cdot E_3) + \end{array}\right]}{\int d^3x \varepsilon\chi^{(3)}|E_3|^2}\right\} \quad (11)$$

There is a subtlety in the application of perturbation theory to decaying modes, such as those of a cavity coupled to output ports. In this case, the modes are not truly eigenmodes, but are rather "leaky modes, and are not normalizable. Perturbative methods in this context are discussed in more detail by, but for a tightly confined cavity mode it is sufficient to simply ignore the small radiating field far away from the cavity. The field in the cavity is very nearly that of a true eigenmode of an isolated cavity.

As stated above, one can arrive at the coupling coefficients by setting $\omega_k \to \omega_k + \delta\omega_k$ in Eq. 1. However, the frequency perturbations $\delta\omega_k$ are time-independent quantities, and we need to connect them to the time-dependent $a_k$ amplitudes. Therefore, to re-introduce the time dependence, one can use the slowly varying envelope approximation: a slowly varying, time-dependent amplitude $a_k(t)$ is introduced into the unperturbed fields $E_k \rightarrow E_k a_k(t)$. The eigenmode must be normalized so that $|a_k|^2$ is the energy, as assumed for the coupled-mode theory. Thus, we divide each $E_k$ by $$\sqrt{\frac{1}{2} \int \varepsilon |E_k|^2}$$

First, the $\chi^{(2)}$ medium is considered. Carrying out the above substitutions in Eqs. 8-9 and grouping terms proportional $a_k$ yields Eqs. 3-4 with $\alpha_{ij}$ and $\beta_i$ given by:

$$\alpha_{ij} = 0 \quad (12)$$

$$\beta_1 = \frac{1}{4} \frac{\int d^3 x \sum_{ijk} \varepsilon \chi^{(2)}_{ijk}[E^*_{1i}(E_{2j}E^*_{1k} + E^*_{1j}E_{2k})]}{[\int d^3 x \varepsilon |E_1|^2] \cdot [\int d^3 x \varepsilon |E_2|^2]^{1/2}} \quad (13)$$

$$\beta_1 = \frac{1}{4} \frac{\int d^3 x \sum_{ijk} \varepsilon \chi^{(2)}_{ijk} E^*_{2i} E_{1j} E_{1k}}{[\int d^3 x \varepsilon |E_1|^2] \cdot [\int d^3 x \varepsilon |E_2|^2]^{1/2}} \quad (14)$$

A similar calculation yields the $\chi^{(3)}$ coupled-mode equations with coefficients given by:

$$a_{ii} = \frac{1}{8} \frac{\int d^3 x \varepsilon \chi^{(3)} \cdot |E_i \cdot E_i|^2 + |E_i \cdot E^*_i|^2}{[\int d^3 x \varepsilon |E_i|^2]^2} \quad (15)$$

$$a_{ij} = \frac{1}{4} \frac{\int d^3 x \varepsilon \chi^{(3)} \cdot |E_i|^2 \cdot |E_2|^2 + |E_1 \cdot E_3|^2 + |E_1 \cdot E^*_3|^2}{[\int d^3 x \varepsilon |E_i|^2]^2} \quad (16)$$

$$\alpha_{ij} = \alpha_{ji} \quad (17)$$

$$\beta_1 = \frac{3}{8} \frac{\int d^3 x \varepsilon \chi^{(3)} \cdot (E^*_1 \cdot E^*_1)^2 (E^*_1 \cdot E_3)^2}{[\int d^3 x \varepsilon |E_1|^2]^{3/2} \cdot [\int d^3 x \varepsilon |E_3|^2]^{1/2}}$$

$$\beta_3 = \frac{1}{8} \frac{\int d^3 x \varepsilon \chi^{(3)} \cdot (E_1 \cdot E_1)^2 (E_1 \cdot E^*_3)^2}{[\int d^3 x \varepsilon |E_1|^2]^{3/2} \cdot [\int d^3 x \varepsilon |E_3|^2]^{1/2}} \quad (18)$$

Note that Eqs. 13-15 verify the conditions $\omega_1 \beta_1 = \omega_2 \beta^*_2$ and $\omega_1 \beta_1 = \omega_3 \beta^*_3$, previously derived from conservation of energy—for $\chi^{(2)}$, this requires that one apply the symmetries of the $\chi^{(2)}_{ijk}$ tensor, which is invariant under permutations of ijk for a frequency-independent $\chi^{(2)}$. Furthermore, one can relate the coefficients $\alpha$ and $\beta$ to an effective modal volume V. In particular, the strongest possible nonlinear coupling will occur if the eigenfields are a constant in the nonlinear material and zero elsewhere. In this case, any integral over the fields will simply yield the geometric volume V of the nonlinear material. Thus, for the $\chi^{(2)}$ effect one would obtain $\beta_i \sim \chi^{(2)}/\sqrt{V\varepsilon}$; similarly, for the $\chi^{(3)}$ effect one can obtain $\alpha_{ij}, \beta_i \sim \chi^{(3)}/V\varepsilon$. This proportionality to $1/\sqrt{V}$ and $1/V$ carries over to more realistic field profiles, and in fact could be used to define a modal volume for these effects.

To check the predictions of the $\chi^{(3)}$ coupled-mode equations, a FDTD simulation is performed of the one-dimensional waveguide-cavity system shown in FIG. 1B, whose analytical properties are uniquely suited to third-harmonic generation. This geometry consists of a semi-infinite photonic-crystal structure made of alternating layers of dielectric ($\varepsilon_1 = 13$ and $\varepsilon_2 = 1$) with period a and thicknesses given by the quarter-wave condition ($d_1 = \sqrt{\varepsilon_2}/(\sqrt{\varepsilon_1} + \sqrt{\varepsilon_2})$ and $d_2 = a - d_1$, respectively). Such a quarter-wave stack possesses a periodic sequence of photonic band gaps centered on frequencies $\omega_1 = (\sqrt{\varepsilon_1} + \sqrt{\varepsilon_2})/4\sqrt{\varepsilon_1 \varepsilon_2}$ (in units of $2\pi c/a$) for the lowest gap, and higher-order gaps centered on odd multiples of $\omega_1$.

Moreover, a defect formed by doubling the thickness of a $\varepsilon_1$ layer creates cavity modes at exactly the middle of every one of these gaps. Therefore, it automatically satisfies the frequency-matching condition for third-harmonic generation. In fact, it is too good: there will also be "ninth harmonic" generation from $\omega_3$ to $\omega_9$. This unwanted process is removed, however, by the discretization error of the FDTD simulation, which introduces numerical dispersion that shifts the higher-frequency modes. To ensure the $\omega_3 = 3\omega_1$ condition in the face of this dispersion, the structure is slightly perturbed increasing the dielectric constant slightly at the nodes of the third-harmonic eigenfield to tune the frequencies. The simulated crystal was effectively semi-infinite, with many more layers on the right than on the left of the cavity. On the left of the cavity, after two period of the crystal the material is simply air ($\varepsilon = 1$), terminated by a perfectly matched layer (PML) absorbing boundary region.

The cavity is excited with an incident plane wave of frequency $\omega_1$, and compute the resulting reflection spectrum. The reflected power at $\omega_3$, the third-harmonic generation, was then compared with the prediction of the coupled-mode theory. The frequencies, decay rates, and $\alpha$ and $\beta$ coefficients in the coupled-mode theory were computed from a linear FDTD simulation in which the eigenmodes were excited by narrow-band pulses. The freely available FDTD code of was employed.

Figure 2:
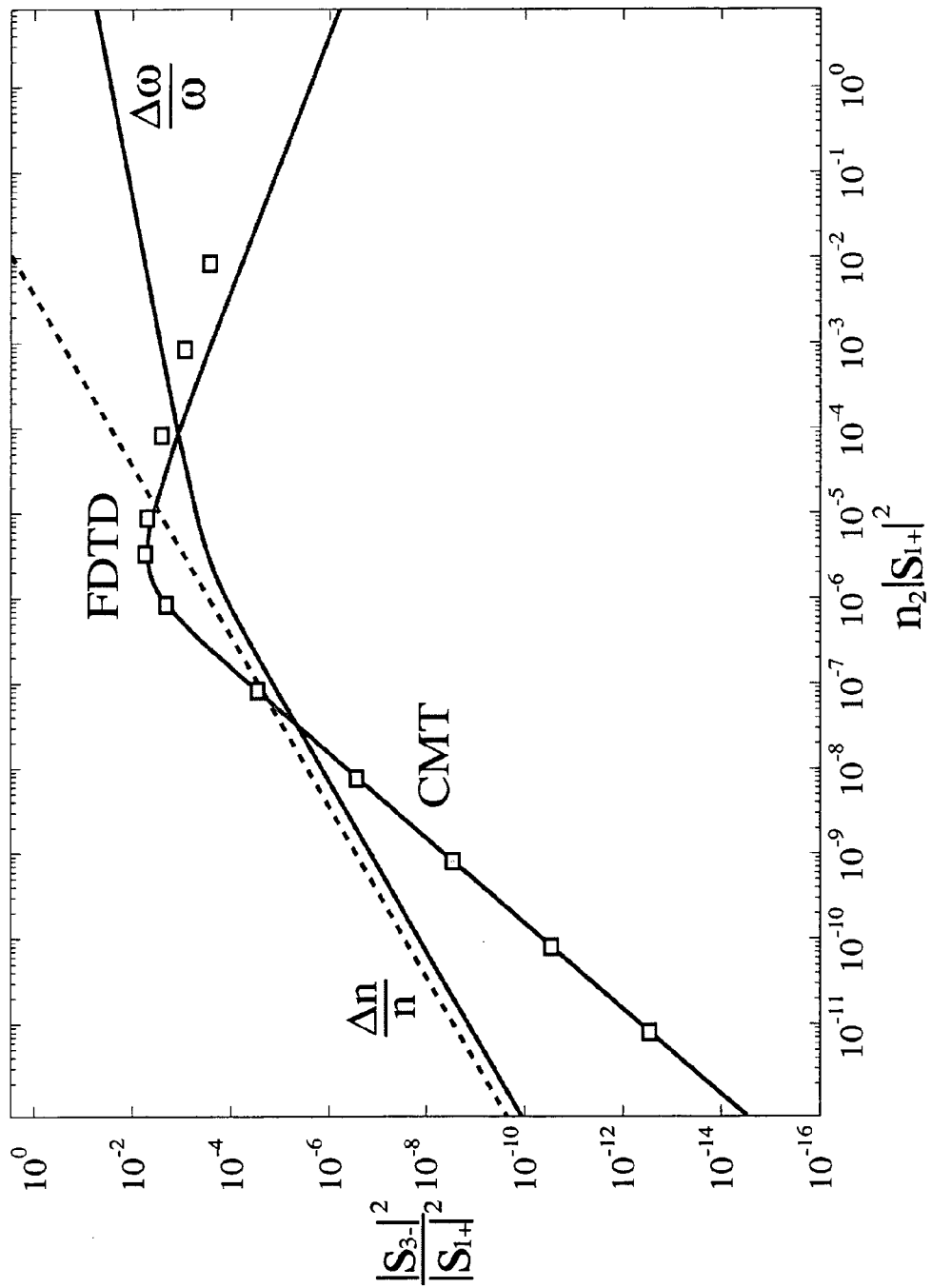
FIG. 2 is a graph illustrating a Log-log plot of $|s_{3-}|^2/|s_{1+}|^2$ vs. $n_2|s_{1+}|^2$ for the coupled-mode theory and FDTD.

The results are shown in FIG. 2, in which the output power at $\omega_1$ and $\omega_3 = 3\omega_1$ is denoted by $|s_{1-}|^2$ and $|s_{3-}|^2$, respectively, while the input power at $\omega_1$ is denoted by $|s_{1+}|^2$. In particular, we plot convenient dimensionless quantities: the third-harmonic conversion efficiency $|s_{3-}|^2/|s_{1+}|^2$ as a function of the dimensionless product $n_2|s_{1+}|^2$ in terms of the standard Kerr coefficient $n_2 = 3\omega^{(3)}/4c\varepsilon$. There is clear agreement between the FDTD and CMT for small values of $n_2|s_{1+}|^2$ (in which limit the conversion goes quadratically with $n_2|s_{1+}|^2$). However, as the input power increases, they eventually begin to disagree, marking the point where second-order corrections are required. This disagreement is not a practical concern, however, because the onset of second-order effects coincides with the limits of typical materials, which usually break down for $\Delta n/n \equiv \chi^{(3)}$ max $|E|^2/2\varepsilon > 1\%$. This is the maximum index shift $\Delta n/n$ is plotted in FIG. 2.

Also shown in FIG. 2 is a plot of $\Delta \omega_1/\omega_1 = \text{Re}[\delta \omega_1/\omega_1]$. As expected, when $\Delta \omega_1$ is of the order of $1/Q_1 \sim 10^{-3}$, the frequency shift begins to destroy the frequency matching condition, substantially degrading the third-harmonic conversion. It might seem that $\Delta n/n$ and $\Delta \omega_1/\omega_1$ should be comparable, but this is not the case because $\Delta n/n$ is the maximum index shift while $\Delta \omega_1/\omega_1$ is due to an average index shift.

More specifically, the details of our simulation are as follows. To simulate a continuous wave (CW) source spectrum in FDTD, one can employ a narrow-frequency Gaussian pulse incident from the air region. This pulse is carefully normalized so that the peak intensity is unity, to match the CMT. The field in the air region is Fourier transformed and subtracted from the incident field to yield the reflected flux. Using only two periods of quarter-wave stack on the left of the cavity we obtained two cavity modes with real frequencies $\omega_1$=0.31818 ($2\pi c/a$), $\omega_2$=0.95454 ($2\pi c/a$) and quality factors $Q_1$=1286 and $Q_3$=3726, respectively. Given these field patterns, one can compute the $\alpha_{ij}$ and $\beta_i$ coefficients. The following coupling coefficients are obtained, in units of $\chi^{(3)}$: $\alpha_{11}$=4.7531×10$^{-4}$, $\alpha_{22}$=5.3306×10$^{-4}$, $\alpha_{12}$=$\alpha_{21}$=2.7847×10$^{-4}$, $\beta_1$=(4.55985−0.7244)×10$^{-5}$.

The conditions under which one may achieve complete frequency conversion is being considered: 100% of the incident power converted to output at the second or third harmonic frequency. As we shall see, this is easiest to achieve in the $\chi^{(2)}$ case, and requires additional design criteria in the $\chi^{(3)}$ case.

The key fact in a $\chi^{(2)}$ medium is that there are no frequency-shifting terms ($\alpha$=0), so the resonance condition $\omega_2$=$2\omega_1$ is not spoiled as one increases the power. The only requirement that we must impose is that external losses such as absorption are negligible ($\tau_{k,e} \gg \tau_{k,s}$). In this case, 100% conversion corresponds to setting $s_{1-}$=0 in the steady-state. Using this fact, an input source $s_+(t)=s_{1+}\exp(iw_1 t)$ yields the following condition on the input power for 100% conversion:

$$|s_{1+}|^2 = \frac{2}{\omega_1^2|\beta_1|^2 \tau_{2,s}\tau_{1,s}^2} = \frac{\omega_1}{2|\beta_1|^2 Q_2 Q_1^2} \tag{19}$$

A similar dependence of efficiency on $Q_1^2 Q_2$ was previously observed although a critical power was not identified. Thus, we can always choose an input power to obtain 100% conversion. If $Q_1 \sim Q_2$, then this critical power scales as V/Q$^3$ where V is the modal volume, recall that $\beta \sim 1/\sqrt{V}$.

This is limited, however, by first-order approximation: if the input power becomes so large that second-order effects (or material breakdown) become significant, then this prediction of 100% conversion is no longer valid. However, if one chooses $Q_1$ and/or $Q_2$ to be sufficiently large, then the critical power can be made arbitrarily small in principle. Not only does the critical power decrease with Q$^3$, but the field intensity in the cavity ($|a_i|^2$) decreases as V/$Q_1 Q_2$, and thus one can avoid material breakdown as well as lowering the power.

Figure 3:
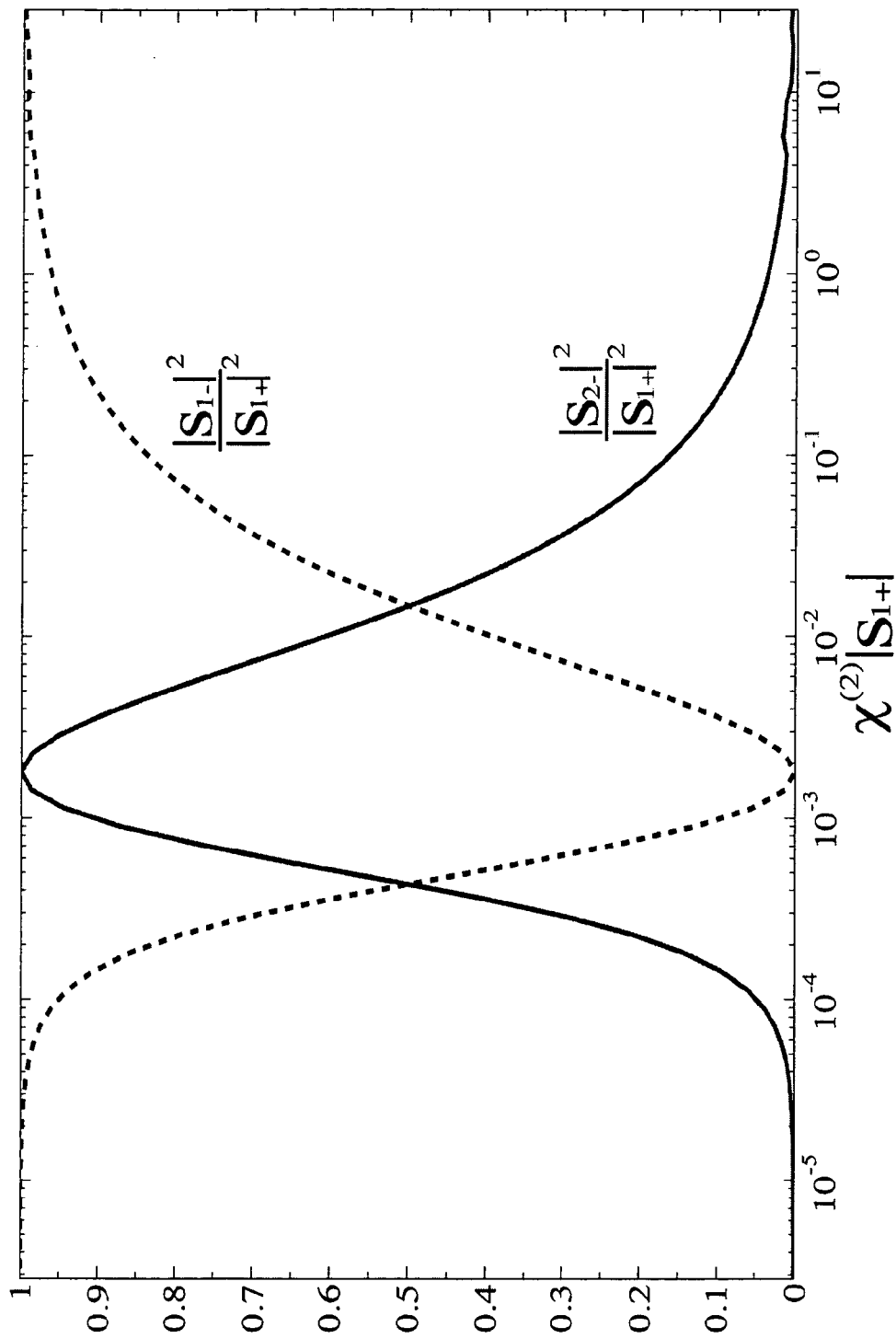
FIG. 3 is a graph illustrating first and second harmonic efficiency.

To illustrate second-harmonic conversion for a $\chi^{(2)}$ medium, one can plot the solution to the coupled-mode equations as a function of input power in FIG. 3. The 100% conversion at the predicted critical power is clearly visible. For this calculation, one can choose modal parameters similar to the ones from the FDTD computation before: $\omega_1$=0.3, $\chi_2$=0.6, $Q_1$=10$^4$, $Q_2$=2×10$^4$, with dimensionless $\beta_1$=(4.55985−0.7244)×10$^{-5}$.

A $\chi^{(3)}$ medium, on the other hand, does suffer from nonlinear frequency shifts. For example, FIG. 2, which is by no means the optimal geometry, exhibits a maximal efficiency of $|s_{3-}|^2/|s_{1+}|^2 \approx 4 \times 10^{-3}$, almost three orders of magnitude away from complete frequency conversion. On the other hand, one can again achieve 100% conversion if one can force $\alpha_{ij}$=0, which can be done in two ways. First, one could employ two $\chi^{(3)}$ materials with opposite-sign $\chi^{(3)}$ values.

For example, if the $\chi^{(3)}$ is an odd function around the cavity center, then the integrals for $\alpha_{ij}$ will vanish while the $\beta$ integrals will not. (In practice, $\alpha \ll \beta$ should suffice.) Second, one could pre-compensate for the nonlinear frequency shifts: design the cavity so that the shifted frequencies, at the critical power below, satisfy the resonant condition $\omega_3 + \Delta\omega_3 = 3(\omega_1 + \Delta\omega_1)$. Equivalently, design the device for $\alpha_{ij}$=0 and then adjust the linear cavity frequencies a posteriori to compensate for the frequency shift at the critical power.

If $\alpha_{ij}$ is thereby forced to be zero, and we can also neglect external losses (absorption, etc.) as above, then 100% third-harmonic conversion ($s_{1-}$=0) is obtained when:

If $Q_1 \sim Q_3$, then this critical power scales as V/Q$^2$ where V is the modal volume (recall that $\beta \sim 1/V$). This is precisely the scaling that was predicted for the power to obtain nonlinear bistability in a single-mode cavity. Similarly, one finds that the energy density in the cavity ($|a_i|^2$) decreases proportional to V/$\sqrt{Q_1 Q_3}$.

$$|s_{1+}|^2 = \left[\frac{4}{3\omega_1^2 |\beta_1|^2 \tau_{1,s}^3 \tau_{3,s}}\right]^{1/2} = \left[\frac{\omega_1 \omega_3}{12|\beta_1|^2 Q_1^3 Q_3}\right]^{1/2} \tag{20}$$

If $Q_1 \sim Q_3$, then this critical power scales as V/Q$^2$ where V is the modal volume (recall that $\beta \sim 1/V$). This is precisely the scaling that was predicted for the power to obtain nonlinear bistability in a single-mode cavity. Similarly, one finds that the energy density in the cavity ($|a_i|^2$) decreases proportional to V/$\sqrt{Q_1 Q_3}$.

Figure 4:
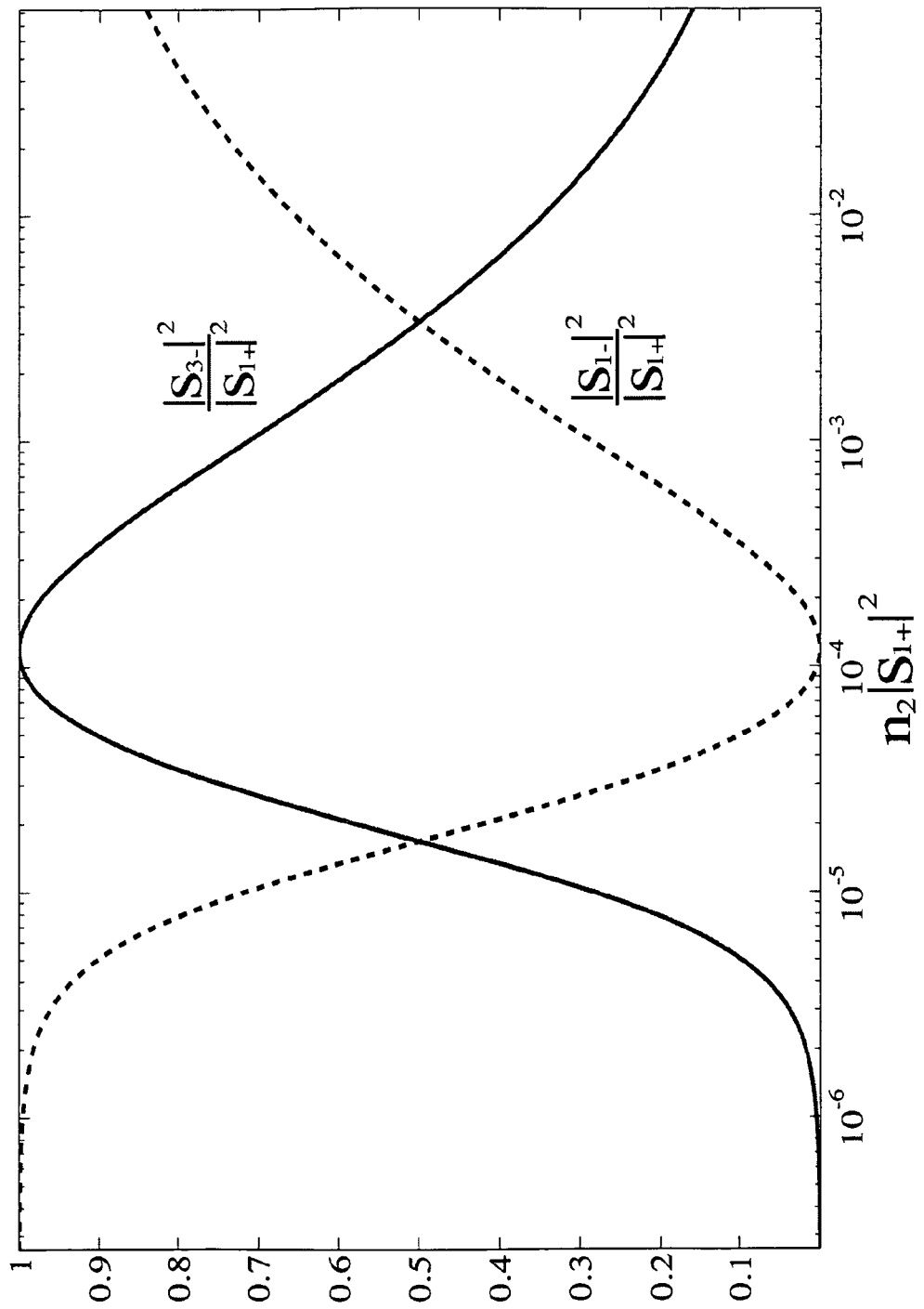
FIG. 4 is a graph illustrating first and third harmonic efficiency.

It has been demonstrated that the third-harmonic conversion for $\alpha_{ij}$=0 by plotting the solution to the coupled-mode equations as a function of input power in FIG. 4. Again, 100% conversion is only obtained at a single critical power. Here, one can use the same parameters as in the FDTD calculation, but with $\alpha$=0. In this case, comparing with FIG. 2, the complete frequency conversion occurs at a power corresponding to $\Delta n/n \approx 10^{-2}$. This is close to the maximum power before coupled-mode theory becomes invalid, either because of second-order effects or material breakdown, but one could easily decrease the critical power by increasing Q.

For both the $\chi^{(2)}$ and the $\chi^{(3)}$ effects, in FIGS. 3-4, the harmonic conversion efficiency goes to zero if the input power (or $\chi$) is either too small or too large. It is not surprising that frequency conversion decreases for low powers, but the decrease in efficiency for high powers is less intuitive. It corresponds to a well-known phenomenon in coupled-mode systems: in order to get 100% transmission from an input port to an output port, the coupling rates to the two ports must be matched in order to cancel the back-reflected wave. In the present case, the coupling rate to the input port is $\sim 1/Q_1$, and the coupling rate to the output "port" (the harmonic frequency) is determined by the strength of the nonlinear coupling. If the nonlinear coupling is either too small or too large, then the rates are not matched and the light is reflected instead of converted. On the other hand, for large input powers, while the conversion efficiency as a fraction of input power goes to zero, the absolute converted power ($|s_{2-}|^2$ or $|s_{3-}|^2$) goes to a constant.

In practice, a real device will have some additional losses, such as linear or nonlinear absorption and radiative scattering. Such losses will lower the peak conversion efficiency below 100%. As we show in this section, their quantitative effect depends on the ratio of the loss rate to the total loss rate 1/Q. We also solve for the critical input power to achieve maximal conversion efficiency in the presence of losses.

For a $\chi^{(2)}$ medium with a linear loss rate $1/\tau_{k,e}$, we solve Eqs. 3-4 for $|s_{2-}|^2$ and enforce the condition for maximal conversion efficiency: $d/dt(|s_{2-}|^2/|s_{1+}|^2)$=0. Thus, the following optimal input power and conversion efficiency is obtained: It immediately follows that for zero external losses, i.e. $\tau_k = \tau_{k,s}$, Eq. 22 gives 100% conversion and Eq. 21 reduces to Eq. 19. For small external losses $\tau_{k,s} \ll \tau_{k,e}$, the optimal efficiency is reduced by the ratio of the loss rates, to first order:

$$|s_{1+}|^2 = \frac{2\tau_{1,s}}{\omega_1^2 |\beta_1|^2 \tau_1^3 \tau_2} \qquad (21)$$

$$\frac{|s_{2-}|^2}{|s_{1+}|^2} = \frac{\tau_1 \tau_2}{\tau_{1,s} \tau_{2,s}} \qquad (22)$$

It immediately follows that for zero external losses, i.e. $\tau_k = \tau_{k,s}$, Eq. 22 gives 100% conversion and Eq. 21 reduces to Eq. 19. For small external losses $\tau_{k,s} \ll \tau_{k,e}$, the optimal efficiency is reduced by the ratio of the loss rates, to first order:

$$\frac{|s_{2-}|^2}{|s_{1+}|^2} \approx 1 - \left(\frac{\tau_{2,s}}{\tau_{2,e}} + \frac{\tau_{1,s}}{\tau_{1,e}}\right) \qquad (23)$$

A similar transmission reduction occurs in coupled-mode theory when any sort of loss is introduced into a resonant coupling process The same analysis for $\chi^{(3)}$ yields the following critical input power and optimal efficiency:

$$|s_{1+}|^2 = \left[\frac{4\tau_{1,s}^2}{\omega_1^2 |\beta_1|^2 \tau_1^5 \tau_2}\right]^{1/2} \qquad (24)$$

$$\frac{|s_{3-}|^2}{|s_{1+}|^2} = \frac{\tau_1 \tau_3}{\tau_{1,s} \tau_{3,s}} \qquad (25)$$

where by comparison with Eq. 22, a first-order expansion for low-loss yields an expression of the same form as Eq. 23: the efficiency is reduced by the ratio of the loss rates, with $\tau_2$ replaced by $\tau_3$.

A $\chi^{(3)}$ medium can also have a nonlinear "two-photon" absorption, corresponding to a complex-valued $\chi^{(3)}$, which gives an absorption coefficient proportional to the field intensity. This enters the coupled-mode equations as a small imaginary part added to $\alpha$, even if one sets the real part of $\alpha$ to zero. The corresponding effect on $\beta$ is just a phase shift. That yields a nonlinear (NL) $\tau_{k,e}$ of the following form, to lowest order in the loss:

$$\frac{1}{\tau^{1,eNL}} \approx \omega_1 \text{Im}\left[\alpha_{11} \frac{\tau_{1,s}}{2} |s_{1+}|^2 + \alpha_{13} \frac{\tau_{3,s}^2 \tau_{1,s}^3}{8} \omega_3^2 |\beta_3|^2 |s_{1+}|^6\right] \qquad (26)$$

$$\frac{1}{\tau^{3,eNL}} \approx \omega_3 \text{Im}\left[\alpha_{31} \frac{\tau_{1,s}}{2} |s_{1+}|^2 + \alpha_{33} \frac{\tau_{3,s}^2 \tau_{1,s}^3}{8} \omega_3^2 |\beta_3|^2 |s_{1+}|^6\right] \qquad (27)$$

These loss rates can then be substituted in the expression for the losses above, in which case one obtains the following optimal efficiency of third-harmonic generation, to lowest-order, not including linear losses: Thus, the nonlinear loss is proportional to the ratio $\text{Im}\alpha/|\beta|$, which is proportional to $\text{Im}\chi^{(3)}/|\chi^{(3)}|$.

$$\frac{|s_{3-}|^2}{|s_{1+}|^2} \approx 1 - \frac{\tau_{3,s}}{|\beta_1|}\sqrt{\frac{\tau_{3,s}}{\tau_{1,s}}} \text{Im}\left[\frac{\alpha_{11} + 3\alpha_{13}}{\tau_{3,s}} + \frac{\alpha_{13} + 3\alpha_{33}}{\tau_{1,s}}\right] \qquad (28)$$

Thus, the nonlinear loss is proportional to the ratio $\text{Im}\alpha/|\beta|$, which is proportional to $\text{Im}\chi^{(3)}/|\chi^{(3)}|$.

The following are possible structures and/or devices that can be used for and/or make use of complete frequency conversion. The goal is to use Eqs. 12-18 so as to maximize $\beta$ and reduce $\alpha$ (in the case of $\chi^{(3)}$ media). One possible cavity structure is a ring resonator, such as the ones shown in FIGS. 5A-5B, which is essentially are dielectric waveguides arranged into a loop. Such resonators can come in many forms, such as rings, disks, spheres, non-circular rings, etcetera, with many degrees of freedom, such as the ring inner and outer shapes, that can be used to optimize the harmonic modes and their overlap to improve harmonic generation.

In particular, FIG. 5A shows a schematic diagram of ring resonator 20 with uniform waveguide coupling to a waveguide structure 24 and FIG. 5B shows a schematic diagram of a ring resonator 22 having an asymmetrical waveguide coupling. In FIG. 5B, the left waveguide 26 allows for propagating modes of frequency $\omega$ and $1\omega$, while the right waveguide 28 does not.

Such resonators can be evanescently coupled to many sorts of waveguides adjacent to the ring, either above or to the side, including optical fibers as well as on-chip dielectric "strip" or "rib" waveguides. Ideally, these will be arranged so that the light from the cavity couples primarily to a single output channel. This can be accomplished in several ways. For example, we could employ an asymmetrical waveguide-cavity geometry, as in FIG. 5B, where one end of the waveguide is terminated in some way, ideally by a mirror such a photonic crystal, such as a periodic structure with a band gap reflecting light back along the waveguide. Another approach could be to use both the right and left sides of the waveguide as a simultaneous input and output port, which could be joined by a Y-coupler of some form.

A dielectric waveguide with a one-dimensional periodicity, for example, a periodic sequence of holes or a periodic grating along the side of the waveguide can have a photonic band gap in its guided modes. This band gap can be used to trap light in a cavity by making a defect in the periodicity, and these cavity modes could be used for harmonic generation. Like the one-dimensional photonic crystal considered earlier, a periodic dielectric waveguide can have higher-order band gaps that can be used to confine the harmonic mode(s), and can also have band gaps at different frequencies for different polarizations which could also be used to confine the harmonic modes. Such defect-cavity designs have numerous degrees of freedom in their geometry which can be used to optimize the coupling between the fundamental and harmonic modes.

A 2D photonic-crystal slab geometry can also be used as a possible device. Such slabs can be used to create cavities that confine light in the plane via a photonic band gap. They can be designed to support multiple cavity modes at harmonic frequencies by, for example, utilizing higher-order band gaps or band gaps in different polarizations.

A practical and useful application of complete frequency conversion is that of high frequency generation of light sources. By employing a system, shown in FIG. 6, one can convert 100% of the light given off by a laser, led or other light source 32 to a higher harmonic. The angular offset $\theta$ of the qw-stack cavity system 34 from the source is there to ensure that one is dealing with a single port (channel) cavity and can be tuned so as to force 100% of the outgoing light at $1\omega$ to travel in the x-direction parallel to the source thus ensuring complete frequency conversion.

Yet another possibility is to have the source and the Bragg-mirror, or any two-channel cavity with two available modes, parallel to each other. In this case, the fact that a two-port cavity is provided will change the maximal achievable efficiency. However, one can still enable 100\% conversion efficiency provided that the coupling to the two channels is asymmetrical. Specifically, one must design one of the ports to couple strongly to the first-harmonic frequency $\omega_1$ while suppressing coupling to the higher-order harmonic frequency $\omega_1$, and design the second port so as to achieve the inverse effect. This enables one to describe the waveguide-cavity, effectively, as a one-port channel for both the fundamental and higher harmonic frequencies.

For example, an asymmetrical waveguide-cavity structure that satisfies the conditions given above can be obtained by careful design of two Bragg-mirrors: one of which should support a band-gap at $\omega_1$, and a smaller band-gap at $\omega_2$ and the other with a similar (but inverted) structure, i.e. small band-gap at $\omega_1$ and larger band-gap at $\omega_2$.

An important nonlinear process which was neglected in the previous analysis is that of sum-frequency generation, or the generation of light with frequency $\omega_1+\omega_2$ from two input signals of frequencies $\omega_1$ and $\omega_1$. The existence of a critical input power for which one could achieve 100% frequency conversion, though not shown above, is definitively more than feasible based on similar arguments as above, i.e. rate matching conditions. Such a device would require of a 3-mode cavity with frequencies $\omega_1$, $\omega_2$ and $\omega_1+\omega_2$. This could be used to make very long wavelength sources.

FIG. 7 shows a schematic diagram of the geometry of a 3d photonic crystal (PhC) cavity 40 created by adding a defect 42 in a rod-layer 44 of a (111) fcc lattice of dielectric rods. Inset 46 shows a planar image of the fundamental mode of the cavity 40. A complete gap system, such as the PhC cavity 40 shown in FIG. 7, can also be used as a harmonic converter with other cavity structures. Such a cavity would dramatically enhance the nonlinear interaction, reduce radiative and material losses, and thus potentially decrease the critical power by orders of magnitude. Since the Q of such a structure does not saturate but rather increases exponentially with the number of surrounding layers, it would be highly desirable as a low-power device. Again, higher-order bandgaps could be employed to confine modes at harmonic frequencies.

In the case of second-harmonic generation, in order to prevent sign-oscillations in the cavity modes from making the overlap integral small, a variety of techniques could be used, ranging from simple optimization of the cavity geometry to maximize the overlap, to using non-uniform "poling" of the materials so that $\chi^{(2)}$ is not uniform over the cavity (for example, it could be concentrated in a particular region, or even oscillate in sign matching the relative signs of the fundamental and harmonic fields).

The same principles apply to nonlinear frequency conversion in other wave-propagation phenomena, such as acoustic waves, water waves, and so on.

The invention presents a rigorous coupled-mode theory for second- and third-harmonic generation in doubly resonant nonlinear cavities, accurate to first order in the nonlinear susceptibility and validated against a direct FDTD simulation. The invention predicts several interesting consequences. First, it is possible to design the cavity to yield 100% frequency conversion in a passive (gain-free) device, even when nonlinear down-conversion processes are included, limited only by fabrication imperfections and losses. Second, this 100% conversion requires a certain critical input power—powers either too large or too small lead to lower efficiency. Third, the invention describes how to compensate for the self-phase modulation in a $\chi^{(3)}$ cavity. The motivation for this invention was the hope that a doubly resonant cavity would lead to 100% conversion at very low input powers.

A typical nonlinear material is gallium arsenide (GaAs), with $\chi^{(2)} \approx 145$ pm/V and $n_2 = 1.5 \times 10^{-13}$ cm$^2$/W at 1.5 µm. Al doping is usually employed to decrease nonlinear losses near resonance. Although this has both $\chi^{(2)}$ and $\chi^{(3)}$ effects, one can selectively enhance one or the other by choosing the cavity to have resonances at either the second or third harmonic. Many well confined optical cavity geometries are available at these wavelengths and have been used for nonlinear devices, such as ring resonators or photonic-crystal slabs.

Conservative parameters are assumed for the cavity: a lifetime $Q_1=1000$, $Q_2=2000$, $Q_3=3000$, and a modal volume of 10 cubic half-wavelengths ($V \approx 10(\lambda/2n)^3$) with roughly constant field amplitude in the nonlinear material, worse than a realistic case of strongly peaked fields. In this case, the critical input power becomes approximately 20 mW for second-harmonic generation and 0.2W for third-harmonic generation with a moderate peak index shift $\Delta n/n \approx 10^{-3}$, justifying the first-order approximation.

Using the expressions for $\alpha$ and $\beta$, optimized cavities for harmonic generation can be designed using standard methods to compute the linear eigenmodes. In practice, experimentally achieving cavity modes with "exactly" harmonic frequencies, matched to within the fractional bandwidth $1/Q$, is a challenge and may require some external tuning mechanism. For example, one could use the nonlinearity itself for tuning, via external illumination of the cavity with an intense "tuning" beam at some other frequency. Also, although one can directly integrate the coupled-mode equations in time, the invention intends to supplement this with a linearized stability analysis at the critical power. This is particularly important for the $\chi^{(3)}$ case, where pre-correcting the frequency to compensate the nonlinear frequency shift (self-phase modulation) may require some care to ensure a stable solution.

Although the present invention has been shown and described with respect to several preferred embodiments thereof, various changes, omissions and additions to the form and detail thereof, may be made therein, without departing from the spirit and scope of the invention.

What is claimed is:

1. A doubly-resonant cavity structure comprising cavity structure having a plurality of resonant modes so as to allow total frequency conversion for second or third-harmonic generation using $\chi^{(2)}$ and $\chi^{(3)}$ nonlinearities between said cavity structures, said total frequency conversion is efficiently optimized by determining a critical power allowing for such total frequency conversion to occur depending only on the quality factors and the frequencies of said cavity structures.

2. The doubly-resonant cavity structure of claim 1 further comprising compensation for the self-phase modulation in a $\chi^{(3)}$ cavity structure.

3. The doubly-resonant cavity structure of claim 1, wherein said at cavity structures comprises lifetime values between 1000 and 3000.

4. The doubly-resonant cavity structure of claim 1, wherein said cavity structures comprises a ring resonator coupled to a waveguide structure.

5. The doubly-resonant cavity structure of claim 1, wherein said at least one doubly-resonant cavity structures comprises a ring resonator asymmetrically coupled to a waveguide structure.

6. The doubly-resonant cavity structure of claim 1, wherein said cavity structures comprises a Fabry-Perot cavity structure coupled to a quarter-wave stack.

7. The doubly-resonant cavity structure of claim 1, wherein said cavity structures comprises a led light source and quarter-wave stack.

8. The doubly-resonant cavity structure of claim 1, wherein said cavity structures comprises a photonic crystal cavity.

9. The doubly-resonant cavity structure of claim 8, wherein said photonic crystal cavity structure comprises a defect in a rod-layer.

10. A method of performing total frequency conversion in a doubly-resonant cavity structure comprising:
providing cavity structures having a plurality of resonant modes so as to allow said total frequency conversion for second or third-harmonic generation using $\chi^{(2)}$ and $\chi^{(3)}$ nonlinearities between said cavity structures;
determining the cavity parameter of said cavity structures;
determining a critical power to efficiently optimized said total frequency conversion using the cavity parameters of said cavity structures; and
applying said critical power so as to allow total frequency conversion between said cavity structures to occur.

11. The method of claim 10 further comprising providing compensation for the self-phase modulation in a $\chi^{(3)}$ cavity structure.

12. The method of claim 10, wherein said cavity structures comprises lifetime values between 1000 and 3000.

13. The method of claim 10, wherein said cavity structures comprises a ring resonator coupled to a waveguide structure.

14. The method of claim 10, wherein said cavity structures comprises a ring resonator asymmetrically coupled to a waveguide structure.

15. The method of claim 10, wherein said cavity structures comprises a Fabry-Perot cavity structure coupled to a quarter-wave stack.

16. The method of claim 10, wherein said cavity structures comprises a led light source and quarter-wave stack.

17. The method of claim 10, wherein said cavity structures comprises a photonic crystal cavity.

18. The method of claim 17, wherein said photonic crystal cavity structure comprises a defect in a rod-layer.

19. A method of forming a doubly-resonant cavity structure comprising:
forming a cavity structures having a plurality of modes so as to allow total frequency conversion for second or third-harmonic generation using $\chi^{(2)}$ and $\chi^{(3)}$ nonlinearities between said cavity structures; and
determining the cavity parameters of said cavity structures so as to determine the critical power needed to perform said total frequency conversion.

20. The method of claim 19 further comprising providing compensation for the self-phase modulation in a $\chi^{(3)}$ cavity structure.

21. The method of claim 19, wherein said cavity structures comprises lifetime values between 1000 and 3000.

22. The method of claim 10, wherein said cavity structures comprises a ring resonator coupled to a waveguide structure.

23. The method of claim 19, wherein said cavity structures comprises a ring resonator asymmetrically coupled to a waveguide structure.

24. The method of claim 19, wherein said cavity structures comprises a Fabry-Perot cavity structure coupled to a quarter-wave stack.

25. The method of claim 19, wherein said cavity structures comprises a led light source and quarter-wave stack.

26. The method of claim 19, wherein said cavity structures comprises a photonic crystal cavity.

27. The method of claim 26, wherein said photonic crystal cavity structure comprises a defect in a rod-layer.

* * * * *

UNITED STATES PATENT AND TRADEMARK OFFICE
CERTIFICATE OF CORRECTION

| | | |
|---|---|---|
| PATENT NO. | : 7,768,694 B2 | Page 1 of 1 |
| APPLICATION NO. | : 12/030459 | |
| DATED | : August 3, 2010 | |
| INVENTOR(S) | : Rodriguez et al. | |

It is certified that error appears in the above-identified patent and that said Letters Patent is hereby corrected as shown below:

IN THE SPECIFICATION:

Please replace the following sponsorship information at column 1, line 10 of the issued patent:

-- This invention was made with government support under grant number DMR0213282 awarded by the National Science Foundation. The government has certain rights in this invention. --

Signed and Sealed this
Twenty-ninth Day of March, 2011

David J. Kappos
*Director of the United States Patent and Trademark Office*